(12) United States Patent
Balkhair (10) Patent No.: US 9,945,573 B2
(45) Date of Patent: Apr. 17, 2018

(54) AIR CONDITIONER SYSTEM WITH AIR TREATMENT INTEGRATION

(71) Applicant: Samah Mobarak Balkhair, Rochester, NY (US)

(72) Inventor: Samah Mobarak Balkhair, Rochester, NY (US)

( * ) Notice: Subject to any disclaimer, the term of this patent is extended or adjusted under 35 U.S.C. 154(b) by 394 days.

(21) Appl. No.: 14/604,201

(22) Filed: Jan. 23, 2015

(65) Prior Publication Data

US 2016/0215993 A1     Jul. 28, 2016

(51) Int. Cl.
*F24F 11/00* (2006.01)
*G05B 15/02* (2006.01)
*F24F 3/16* (2006.01)

(52) U.S. Cl.
CPC ........ *F24F 11/006* (2013.01); *F24F 11/0034* (2013.01); *G05B 15/02* (2013.01); *F24F 2003/1689* (2013.01); *F24F 2011/0073* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 4,601,886 A | 7/1986 | Hudgins | |
| 7,483,964 B1 * | 1/2009 | Jackson | H04L 12/2809 455/41.1 |
| 8,170,405 B2 | 5/2012 | Harris | |
| 2004/0009700 A1 * | 1/2004 | Patel | H05B 37/0227 439/488 |

(Continued)

FOREIGN PATENT DOCUMENTS

| | | |
|---|---|---|
| CN | 201787671 U | 4/2011 |
| CN | 102072533 A | 5/2011 |

(Continued)

OTHER PUBLICATIONS

Citroen, "Innovations for on-board comfort and relaxed driving", http://www.citroenet.org.uk/passenger-cars/psa/c4/c4-data/c4-09.html.

(Continued)

*Primary Examiner* — Thomas Lee
*Assistant Examiner* — Gary Collins
(74) *Attorney, Agent, or Firm* — Oblon, McClelland, Maier & Neustadt, L.L.P.

(57) ABSTRACT

An air conditioning system which includes a controller having processing circuitry connected to a database and a dispenser is disclosed. The controller includes at least one memory, at least one processor, and at least one timer. The timer may be programmable to trigger the dispenser via the controller to dispense an air treatment or scent based on the time of day, morning or evening/night. The air conditioning system also includes a facial recognition camera or a sensor array each configured to cause the dispenser to dispense an air treatment or scent. The facial recognition camera is coupled to the controller to dispense an air treatment or scent based on the majority preference of the recognized faces. The sensor array includes a motion detector and a light detector configured to trigger the dispenser via the controller to dispense an air treatment or scent in an air stream of the air conditioner.

17 Claims, 6 Drawing Sheets

(56) References Cited

U.S. PATENT DOCUMENTS

| | | | |
|---|---|---|---|
| 2005/0123436 A1* | 6/2005 | Cumberland | A61L 2/10 422/5 |
| 2005/0188853 A1* | 9/2005 | Scannell, Jr. | A01G 9/02 96/417 |
| 2006/0064204 A1* | 3/2006 | Kim | F24F 3/12 700/276 |
| 2007/0140532 A1* | 6/2007 | Goffin | G06K 9/00288 382/118 |
| 2011/0004986 A1* | 1/2011 | Vu | E03D 9/007 4/223 |
| 2011/0253797 A1* | 10/2011 | Weening | A61L 9/14 239/1 |
| 2013/0081541 A1* | 4/2013 | Hasenoehrl | A61L 9/035 96/222 |
| 2013/0166073 A1* | 6/2013 | Pine | F24F 11/0034 700/276 |
| 2015/0053781 A1* | 2/2015 | Nelson | F24F 11/006 236/1 C |
| 2015/0084751 A1* | 3/2015 | Crawford | B60H 3/0071 340/384.2 |
| 2015/0298654 A1* | 10/2015 | Joao | G01S 19/13 701/2 |
| 2016/0047565 A1* | 2/2016 | Robinson | H04L 12/2803 700/278 |
| 2016/0085248 A1* | 3/2016 | Gordon | G05D 23/1917 700/276 |
| 2016/0195856 A1* | 7/2016 | Spero | G06N 5/046 700/90 |
| 2017/0098121 A1* | 4/2017 | Ur | G06K 9/00288 |
| 2017/0281822 A1* | 10/2017 | Becker | A61L 9/015 |

FOREIGN PATENT DOCUMENTS

| | | |
|---|---|---|
| JP | 2008-174081 | 7/2008 |
| KR | 10-2011-0105625 | 9/2011 |

OTHER PUBLICATIONS

Classic Heating, "The inscents central air freshener", http://www.angelfire.com/nt/classicheating/inscents.htm.

* cited by examiner

AIR CONDITIONER SYSTEM WITH AIR TREATMENT INTEGRATION

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

This disclosure is related generally to air conditioning systems having an integrated air treatment dispenser. More specifically, this disclosure is related to air conditioners which include a cartridge or filter configured to dispense a user's preferred air treatment.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventionally an air conditioner is used to cool a room, a whole house, or an entire building. At the same time, an air freshener is used to perfume such locations. To spread the scent effectively, a user may place the air freshener beside the air conditioner outlet vents in the air stream (forced air) of the air conditioner to spread or dispense the air freshener.

Clearly, this technique is cumbersome and not very efficient as a way of dispensing the scent of the air freshener within a room or area.

Concerning the background art in this field, although many of the current room aromatization systems are also automatic and programmable, they are localized and have a short range of influence, and they generally function in an isolated manner, within a specific room, which logically results in a smaller range of influence of the aromatization liquid. Aromatization devices that function with scented pellets are also known. Such devices have minimal aromatization impact on the ventilated rooms because the aromatization effect decreases when the pellets start to dry up over time. There are other room aromatization methods, but most of them are manual, and involve air fresheners, incense, essential oils heated by candles, which are manually implemented in order to obtain the desired result. These other methods include gel-type chemical compositions that are applied directly on the air filters and, just as the aromatization pellets, represent not only a lower product yield but also in the latter case, the eventual clogging of the filter pores by the residues of these compositions, thereby obstructing the passage of ventilation in the long term.

All these systems have operational and/or functional limitations and, in some cases, the resulting residues are not recyclable.

SUMMARY

Embodiments include an air conditioner apparatus having processing circuitry. The apparatus also includes at least one dispenser of at least one of an air treatment and a scent, the at least one dispenser being controlled by the processing circuitry. The processing circuitry is configured to control the at least one dispenser to dispense the at least one of the air treatment and the scent into an air stream of the air conditioner apparatus in response to any one of a plurality of triggering events. The triggering events are facial recognition, air contaminant detection, motion detection, and light detection. The triggering event of facial recognition compares and maps recognized faces proximal the air conditioner apparatus to the at least one of the air treatment and the scent to map the recognized faces to a preferred air treatment and scent by a majority rule. The triggering event of air contaminant detection determines whether an air contaminant is present proximal the air conditioner apparatus and performs the dispensing of the at least one of the air treatment and the scent via the processing circuitry in response to the presence of the air contaminant. The triggering event of motion detection determines whether motion is present proximal the air conditioner apparatus and performs the dispensing of the at least one of the air treatment and the scent via the processing circuitry in response to the presence of the motion. The triggering event of light detection determines whether a change in a light level is present proximal the air conditioner apparatus and performs the dispensing of the at least one of the air treatment and the scent via the processing circuitry in response to the change.

Embodiments also include a method comprising activating at least one facial recognition camera. The method also includes scanning and mapping a predetermined area for recognized faces. The method further includes accessing memory of stored air treatment and scent preferences mapped to each recognized face. The method also includes comparing the mapped recognized faces to a database. The method further includes determining a common air treatment and scent preference by a majority rule. The method also includes triggering the dispensing of the determined common air treatment and scent preference into an air stream of an air conditioning system.

Embodiments further include a method comprising activating a sensor array including at least one motion detector, at least one light sensor, and at least one air contaminant detector. The method also includes scanning a predetermined area for motion, a change in light level, and air contaminants. The method further includes accessing memory of stored air treatment and scent preferences per time of day. The method also includes setting the stored air treatment and scent preferences based on a timer clock. The method further includes determining a time of day which corresponds with the stored air treatment and scent preferences. The method also includes triggering the dispensing of the determined air treatment and scent preferences based on the time of day into an air stream of an air conditioning system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

The present disclosure discloses the integration of an air conditioner with an air treatment in a manner in which the air treatment is operable, at least, when the air conditioner is on and projecting an air stream therefrom. Thus, the air treatment is designed to work more effectively and efficiently when combined with the air conditioner.

An integrated air conditioner including an air treatment dispenser or air freshener according to the present embodiments does not require additional tools for dispensing the air treatment.

Figure 1:
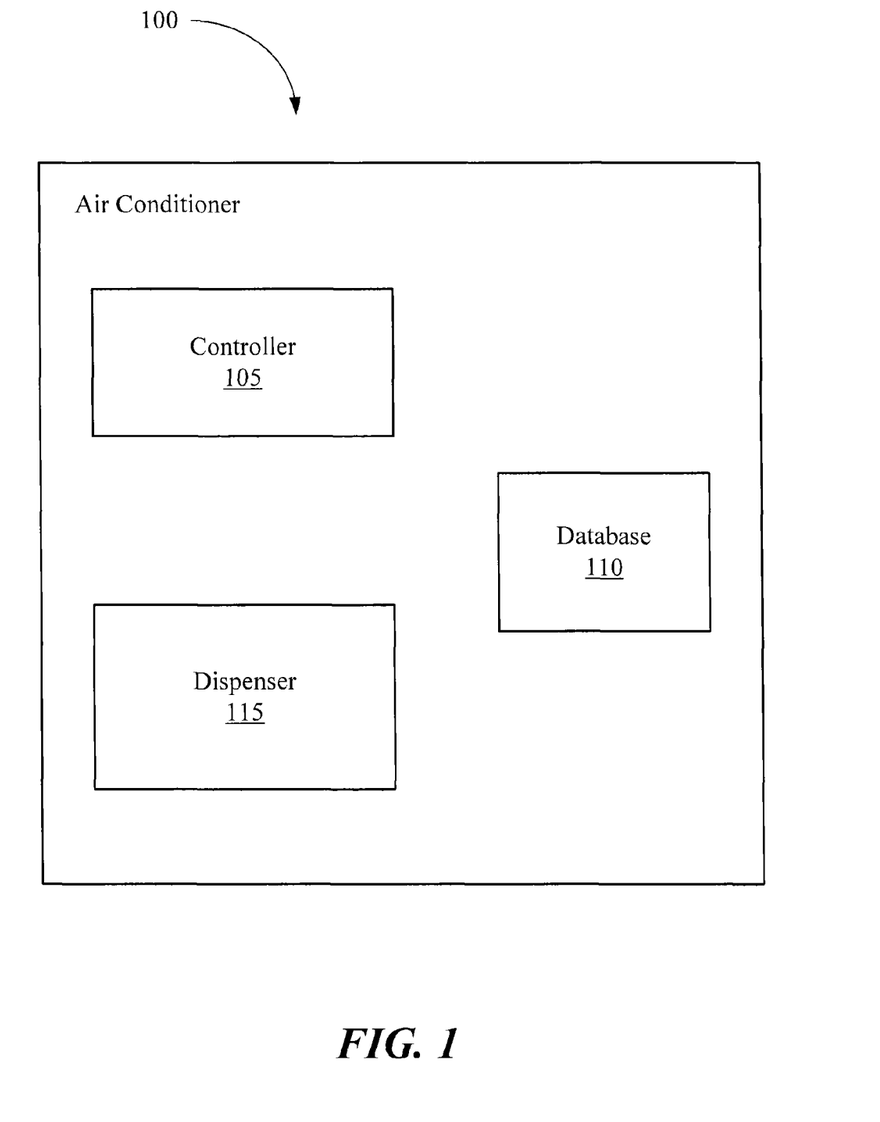
FIG. 1 is a block diagram illustrating an air conditioner according to certain embodiments of the disclosure.

FIG. 1 is a block diagram illustrating an air conditioner 100 according to embodiments of the disclosure. In FIG. 1, air conditioner 100 includes elements, such as cooling fans, compressors, expansion valves, filters, and coils (not shown). Air conditioner 100 further includes a controller 105, a database 110, and a dispenser 115. Although, FIG. 1 shows single elements, it should be understood that controller 105 may include multiple controllers, database 110 may include multiple databases, and dispenser 115 may include multiple dispensers, as needed or required for implementation.

In some embodiments, database 110 may be configured to store and maintain various data correlations, such as air treatment or scent preferences for particular individuals that work or reside in a particular location along with characteristics of these individuals, for example, facial picture or make-up. In another embodiment, database 110 may be configured to store and maintain various data correlations, such as setting a preferred air treatment or scent based on the time of day to invoke a user's mood or energy. In other words, predetermined air treatment or scents may be dispersed in the morning to help energize users and similarly, predetermined air treatment or scents may be dispersed at a different time such as in the evening or night to help relax users. Such a configuration may be useful for businesses and the hospitality industry.

In some embodiments, dispenser 115 may be configured to release an air treatment or scent when triggered by a set of protocols or instructions stored within controller 105. Controller 105 may be electrically connected to a user interface (UI) or the like to receive and store user inputs. Controller 105 may be configured to include a variety of I/O ports, such as a USB port or the like, used to input settings or data to be stored in database 110. Controller 105 includes processing circuitry configured to implement the set of protocols or instructions stored therein.

Dispenser 115 may be electrically connected to controller 105. Dispenser 115 may be, for example, an integrated air treatment or scent cartridge or refillable chamber in air conditioner 100. Dispenser 115 may also be, for example, a spray cartridge or a plurality of cartridges disposed within air conditioner 100 proximal the forced air or air stream. The plurality of cartridges may each comprise a different air treatment to be dispensed based on a particular trigger or program.

Figure 2:
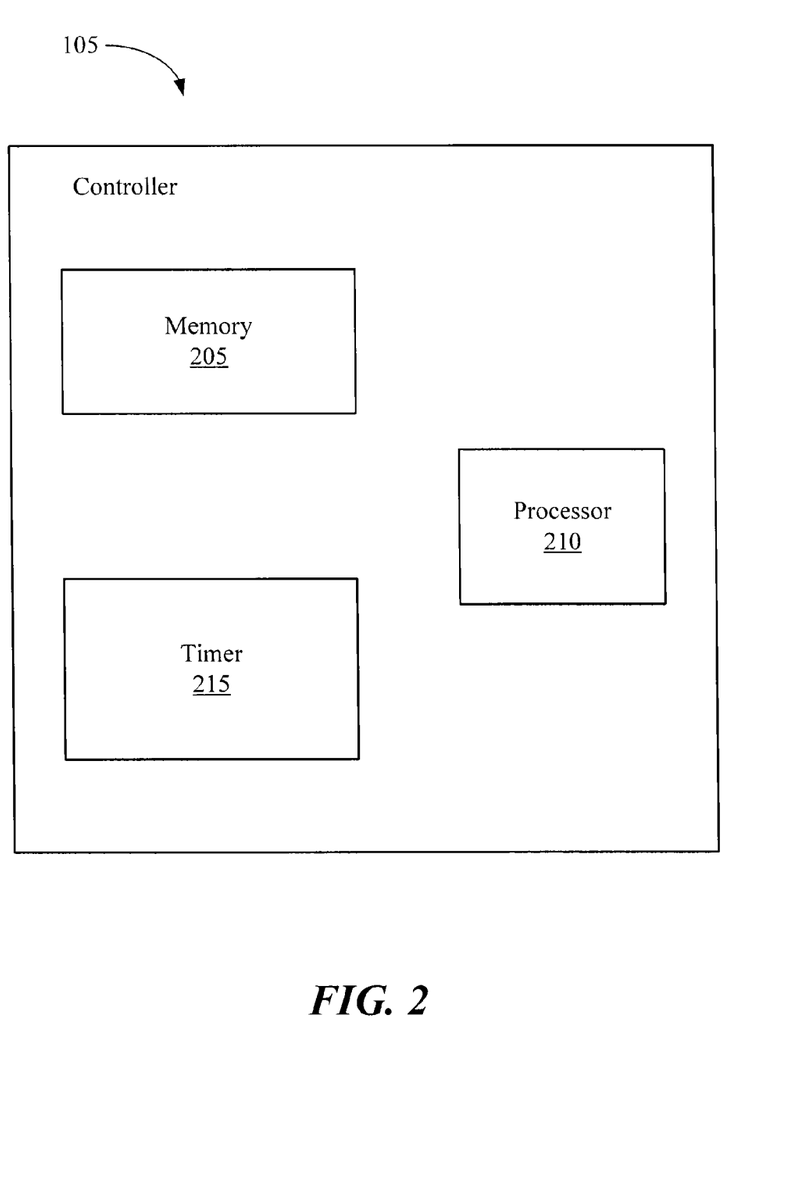
FIG. 2 is a block diagram illustrating a controller of the air conditioner system of FIG. 1 according to certain embodiments of the disclosure.

FIG. 2 is a block diagram illustrating a controller 105 of the air conditioner 100 of FIG. 1 according to certain embodiments of the disclosure. In FIG. 2, controller 105 may include a memory 205, a processor 210, and a timer 215. In some embodiments, memory 205 may be configured to store the preferred air treatments retrieved from database 110. Memory 205 may include RAM, ROM, or the like. Although, FIG. 2 shows single elements, it should be understood that memory 205 may include more than one memory module, processor 210 may include multiple processors, and timer 215 may include multiple timers, as needed or required for implementation.

In certain embodiments, processor 210 may include a central processing unit (CPU) or the like, configured to execute a set of instructions stored on a computer-readable medium or the like. The computer-readable medium may be non-transitory in its configuration. In some embodiments, timer 215 may include a clock timer or a WiFi-synchronized clock timer configured to maintain accurate time by wirelessly receiving a timing signal, including during daylight savings timeframes, etc. In certain embodiment, timer 215 may be a digital clock or a programmable timer in which when the dispenser 115 is triggered, the timer 215 is triggered and tracks the amount of time, for example, "X" which has expired since the triggering of dispenser 115. Hence, by tracking the amount of time "X" which has expired, the timer 215 may be programmed or configured to prevent a subsequent triggering of dispenser 115 if "X" is below a predetermined or set time threshold, for example, at or about 5 or 10 minutes. This configuration can prevent conflicting air treatments or scents from being dispensed at or near the same time.

In certain embodiments, the controller 105 is connected to dispenser 115 to trigger the release of an air treatment or scent into the air stream of the air conditioner 100. Also, controller 105 is connected to the database 110 to access stored preferences of users or the like.

Figure 3:
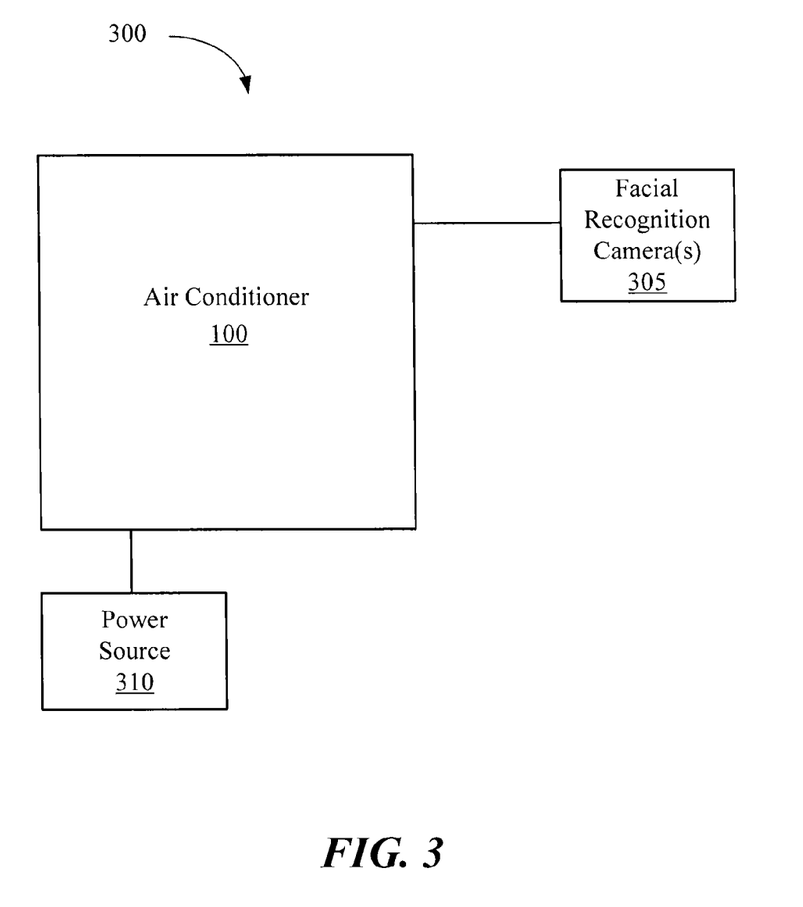
FIG. 3 is a block diagram of an air conditioner system illustrating the air conditioner of FIG. 1 having a facial recognition camera according to certain embodiments of the disclosure.

FIG. 3 is a block diagram of an air conditioner system 300 illustrating the air conditioner 100 of FIG. 1 having a facial recognition camera 305 according to certain embodiments of the disclosure. In FIG. 3, air conditioner 100 is connected to a facial recognition camera 305 and a power source 310. In certain embodiments, the facial recognition camera 305 may include a plurality of cameras linked to more readily determine the various facial geometry and configurations of a particular individual during the recognition process. Facial recognition camera 305 may include internal processors configured to determine facial characteristics and to compare these characteristics to database 110 in air conditioner 100. Air conditioner 100 is connected to power source 310, such as electricity.

Figure 4:
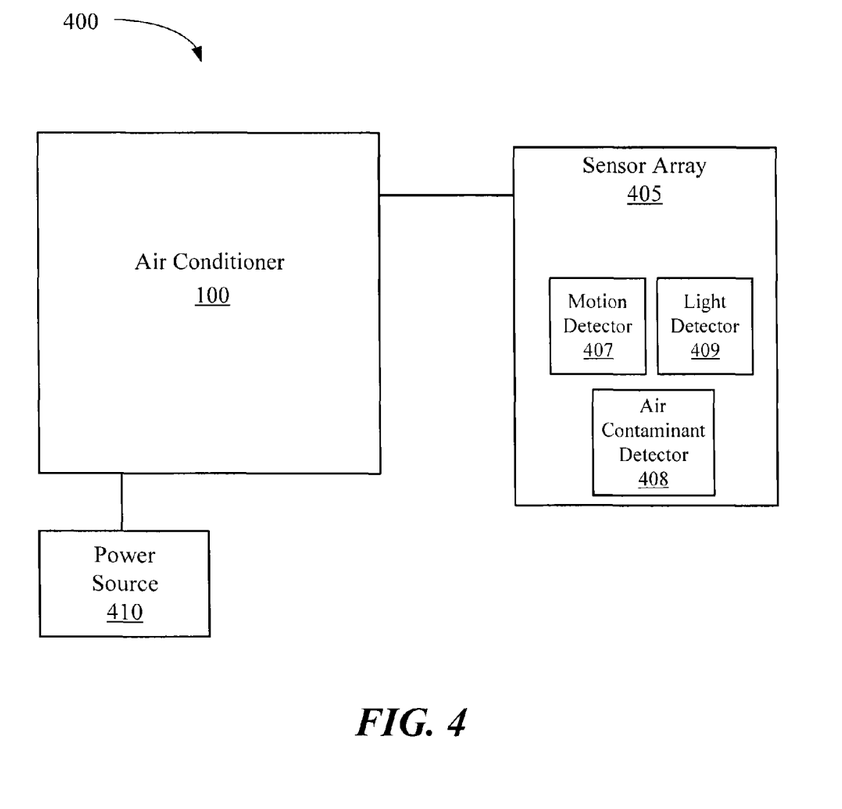
FIG. 4 is a block diagram of an air conditioner system illustrating the air conditioner of FIG. 1 having a sensor array according to certain embodiments of the disclosure.

FIG. 4 is a block diagram of an air conditioner system 400 illustrating the air conditioner of FIG. 1 having a sensor array 405 according to certain embodiments of the disclosure. In FIG. 4, air conditioner 100 is connected to the sensor array 405 and a power source 410. In certain embodiments, sensor array 405 may include a motion detector sensor 407 and/or a light detector sensor 409. Although, FIG. 4 shows single elements, it should be understood that motion detector 407 may include multiple motion detectors and light detector 409 may include multiple light detectors, as needed or required for implementation.

The motion detector 407 is configured to scan a room or structure of predetermined size/area to confirm whether motion is present, that is, a change in the environment has occurred. This detected motion may be in the form of people moving, such as entering the predetermined area. The light detector 409 is configured to pick up any change in the level or amount of received light via photodiodes, photo sensors or the like, that is again, a change in the environment has occurred. In certain embodiments, if motion detector 407 senses motion in the room, it may be configured to send a signal to the controller 105 of air conditioner 100. Subsequently, controller 105 may determine the time of day via timer 215 to then trigger a preferred air treatment or scent from dispenser 115 to enter the air stream of air conditioner 100 to enter the room.

Figure 5:
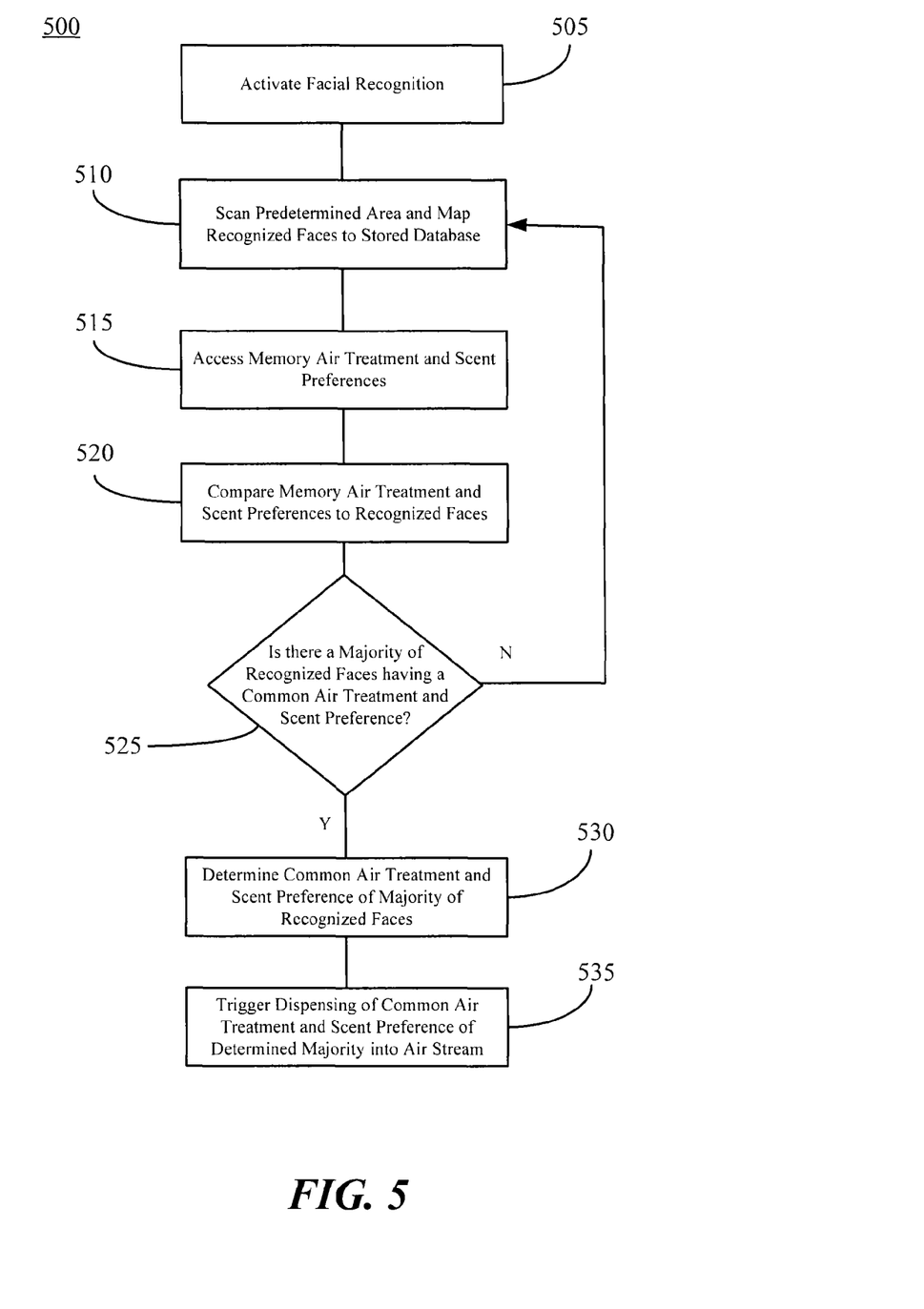
FIG. 5 is a flowchart illustrating a method of dispensing an air treatment or scent triggered by the facial recognition of FIG. 3 according certain embodiments of the disclosure.

FIG. 5 is a flowchart illustrating a method 500 of dispensing an air treatment or scent triggered by the facial recognition of FIG. 3 according certain embodiments of the disclosure. In FIG. 5, method 500 includes at 505, activating facial recognition camera 305. At 510, scanning a predetermined area (room) and mapping recognized faces to the stored database 110 in air conditioner 100. At 515, accessing memory 205 of controller 105 to correlate air treatment or scent preferences of individual users. At 520, comparing the correlated air treatment or scent preferences to the recognized faces found via facial recognition camera 305. At 525, determining whether there is a majority of recognized faces having a common air treatment or scent preference, if not, then the method 500 returns to step 510. At 530, determining common air treatment or scent preference of the majority of recognized faces. At 535, triggering the dispensing of the common air treatment or scent preference of the determined majority via dispenser 115 into the air stream of air conditioner 100.

Figure 6:
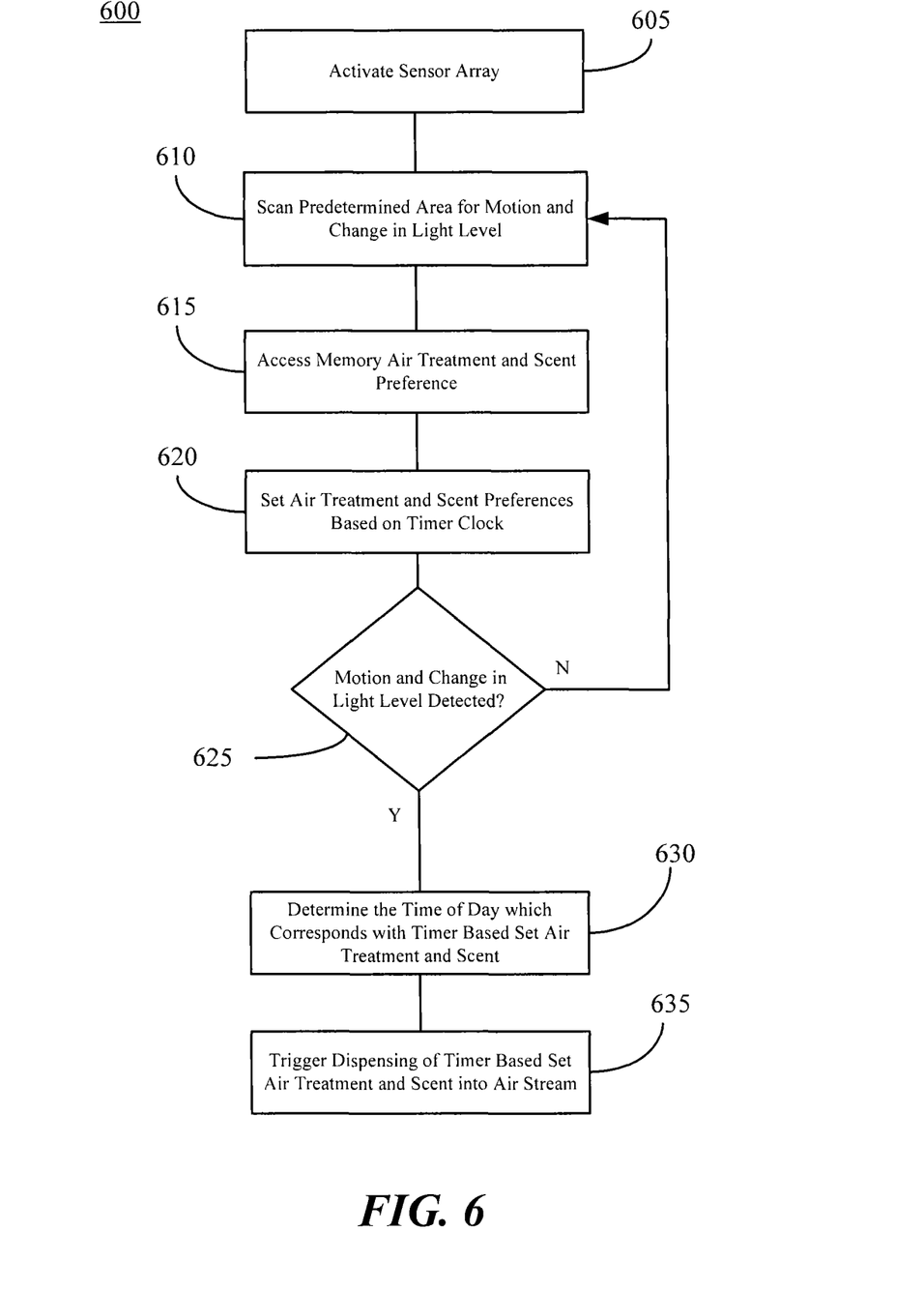
FIG. 6 is a flowchart illustrating a method of dispensing an air treatment or scent triggered by the sensor array of FIG. 4 according to certain embodiments of the disclosure.

FIG. 6 is a flowchart illustrating a method 600 dispensing an air treatment or scent triggered by the sensor array of FIG. 4 according to certain embodiments of the disclosure. In FIG. 6, method 600 includes at 605, activating sensor array 405. At 610, scanning a predetermined area (room or structure) for motion and a change in the light level. At 615, accessing memory 205 of controller 105 to correlate air treatment or scent preferences. At 620, setting air treatment or scent preferences based on timer 215. At 625, determining whether motion and a change in the light level have been detected by motion detector 407 and light detector 409. At 630, determining the time of day which corresponds with the timer 215 and the set air treatment or scent preference. At 635, triggering the dispensing of the timer based set air treatment or scent via dispenser 115 into the air stream of air conditioner 100.

Alternatively, in some embodiments, sensor array 405 may also include an air contaminant detector 408 configured to trigger upon detection the dispensing of an active air purifier from dispenser 115. Further, air conditioner 100 may further be configured to reverse its air stream and internal fan to clear the air of a given space or area after a given time period when the air contaminant detector 408 triggers the dispensing of an odor cancelling air treatment or scent. Also, air contaminant detector 408 may further be configured to detect air borne contaminants, such as allergens or pet dander.

In one embodiment, air treatments or scents can be dispensed in prediction of the foul scents into the atmosphere. For instance, if the system detects that a pet has entered a room or has entered a litter box, a certain scent or air treatment can be dispensed in prediction of a foul scent being generated by the pet. Similarly, in response to the detection of a user entering a wash room, a predictive scent or air treatment or removal of air could be implemented.

Alternatively, in certain embodiments, the controller 105 and dispenser 115 may be configured to be remotely controlled via a remote control. The remote control may be configured to trigger dispensing via dispenser 115 by a click of a button or by programming the controller 105 via the remote control. Further, the remote control may comprise a smart phone, a tablet computer, a personal data assistant (PDA), a wearable device, for example, an activity or health tracker, and/or applications ("apps") embedded therein, such as smart phone apps or web apps.

Alternatively, in some embodiments, the dispenser 115 may contain a pest repellant instead of a set of scents in order to repel pests, such as rodents, insects and the like. The pest repellent may comprise odorless repellent or pleasant scented repellent as not to cause any discomfort to the users.

In one embodiment, the air treatment or scent can be linked to a wake-up alarm such that the air treatment or scent is dispensed in correspondence with the alarm to wake up a resident. Similarly, the air treatment or scent can be linked to a device such as a smart phone or a wearable device such as an activity band or smart watch which signals that the resident is going to sleep. Based on this information a corresponding air treatment or scent could be dispensed which aides in the sleeping process. The system could also detect that the resident is going to sleep based on motion detection or cameras etc.

In one embodiment, the various air treatments or scents can be selectable and linked to particular users via an interface of smart phone application or web application, etc. The timings of the various air treatments or scents can also be modified or selected via the interface.

In one embodiment, the air treatments or scents can be selected based on the health of a user. For instance, based on detecting the health of the user via a camera or via user input or via a health detection device included in or connected to a smart phone or smart watch or activity band, different air treatments or scents could be dispensed. For example, if the user is suffering from congestion, a medicated treatment could be dispensed such as a menthol treatment.

In one embodiment, air treatments or scents can be selected based on the time of year or holidays. For instance, during a particular holiday associated with a scent or associated with the lack of scents, different scents or no scents may be selected for dispersion.

In one embodiment, air treatments or scents can be selected based on what is being cooked or eaten in a particular location. For instance, based on user input regarding what is being cooked or based on detection of the scents by the odor detecting sensor, masking, enhancing or complementary scents or air treatments can be dispensed. For example, if apple pie is being prepared, a commentary scent that enhances the smell of the pie can be dispensed. Alternatively, a complementary scent such as cinnamon could be dispensed while the apple pie is being prepared to enhance the experience. Similarly, scents or air treatments can be dispensed to supplement the process of consuming the food elements.

In one embodiment, air treatments or scents can be selected or an air conditioning system could be controlled to reverse the air stream or to use an internal fan to clear the air based on the detection of allergens such as pet hair or pollen in the air. For instance, once a certain concentration of allergens in the air is detected, the system could automatically reverse course and clear the air in the room or structure of the detected allergens. Similarly, the system could also clear the air of particular scents if it is determined that a new scent should be dispersed based on an instruction by the system.

In one embodiment, the air treatments or scents can be controlled in real-time by a remote device such as a smart phone, smart watch or computer.

In one embodiment, the air treatments or scents which are added to the dispensing device can be registered with or via a remote device such as a smart phone, smart watch or computer such that the air treatments or scents available are known.

In one embodiment, the air treatments or scents can be selected for dispensing based on detecting an unknown user in the room or structure. For instance, a certain generic scent can be selected or a certain sent could be selected for visitors of a certain age or sex, etc.

In one embodiment, a certain air treatments or scents could be selected based on the promotion of a particular product or food.

Any of the embodiments described herein directed to an air conditioner could also be applied to a heating system or a heating, ventilation, and air conditioning (HVAC) system.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An air conditioner apparatus, comprising:
processing circuitry;
a sensor array controlled by the processing circuitry, the sensor array including a motion detector; and
at least one dispenser of at least one of an air treatment and a scent, the at least one of the air treatment and the scent including odorless pest repellant, the at least one dispenser being controlled by the processing circuitry,
wherein the processing circuitry is configured to control the at least one dispenser to dispense the at least one of the air treatment and the scent into an air stream of the air conditioner apparatus in response to five of a plurality of triggering events, the plurality of triggering events including facial recognition, air contaminant detection, motion detection, light detection, and rodent detection,
wherein the triggering event of facial recognition compares and maps recognized faces proximal the air conditioner apparatus to the at least one of the air treatment and the scent to map the recognized faces to a preferred air treatment and scent by a majority rule,
wherein the triggering event of air contaminant detection determines whether an air contaminant is present proximal the air conditioner apparatus and performs the dispensing of the at least one of the air treatment and the scent via the processing circuitry in response to the presence of the air contaminant,
wherein the triggering event of motion detection determines whether motion is present proximal the air conditioner apparatus and performs the dispensing of the at least one of the air treatment and the scent via the processing circuitry in response to the presence of the motion and based on a location of the motion,
wherein the triggering event of light detection determines whether a change in a light level is present proximal the air conditioner apparatus and performs the dispensing of the at least one of the air treatment and the scent via the processing circuitry in response to the change, and
wherein the triggering event of rodent detection identifies the presence of a rodent via the motion detector, wherein the processing circuitry controls the at least one dispenser to dispense the odorless pest repellant into the air stream of the air conditioner apparatus in response to identifying the presence of the rodent.

2. The air conditioner apparatus according to claim 1, wherein the processing circuitry includes at least one memory, at least one processor, and at least one timer.

3. The air conditioner apparatus according to claim 1, further comprising:
at least one facial recognition camera controlled by the processing circuitry.

4. The air conditioner apparatus according to claim 1, wherein the processing circuitry is further configured to select any one of the plurality of triggering events based on a user interface.

5. The air conditioner apparatus according to claim 1, wherein the at least one of the air treatment and the scent includes a fragrance and an air purifier.

6. The air conditioner apparatus according to claim 5, wherein the at least one of the air treatment and scent further includes a medical treatment.

7. The air conditioner apparatus according to claim 6, further including a health triggering event of the plurality of triggering events, the health triggering event determining the health of an occupant and a corresponding medical treatment to be dispensed based on the health, wherein the processing circuitry controls the at least one dispenser to dispense the medical treatment into the air stream of the air conditioner apparatus based on the determining.

8. The air conditioner apparatus according to claim 5, wherein the scent includes a scent corresponding to cooking event input by a user.

9. The air conditioner apparatus according to claim 1, wherein the sensor array further includes a light detector, and an air contaminant detector.

10. The air conditioner apparatus of claim 9, wherein the at least one air treatment and scent includes an air treatment corresponding to a pet odor.

11. The air conditioner apparatus of claim 10, wherein the motion detector is configured to detect the presence of a pet and to dispense air treatment corresponding to the pet odor in response to the detection of the presence of the pet.

12. The air conditioner apparatus according to claim 1, wherein the facial recognition triggering event includes at least one facial recognition camera controlled by the processing circuitry.

13. The air conditioner apparatus according to claim 1, wherein the air contaminant detection triggering event includes at least one air contamination detector controlled by the processing circuitry.

14. The air conditioner apparatus according to claim 1, wherein the motion detection triggering event includes at least one motion detector controlled by the processing circuitry.

15. The air conditioner apparatus according to claim 1, wherein the light detection triggering event includes at least one light detector connected to the processing circuitry.

16. A method implemented by an air conditioner apparatus having processing circuitry and at least one dispenser controlled by the processing circuitry, the method comprising:

controlling, via the processing circuitry, the at least one dispenser to dispense the at least one of the air treatment and the scent into an air stream of the air conditioner apparatus in response to five of a plurality of triggering events, the plurality of triggering events including facial recognition, air contaminant detection, motion detection, light detection, and rodent detection, the at least one of the air treatment and the scent including odorless pest repellant, wherein the triggering event of facial recognition compares and maps recognized faces proximal the air conditioner apparatus to the at least one of the air treatment and the scent to map the recognized faces to a preferred air treatment and scent by a majority rule, wherein the triggering event of air contaminant detection determines whether an air contaminant is present proximal the air conditioner apparatus and performs the dispensing of the at least one of the air treatment and the scent via the processing circuitry in response to the presence of the air contaminant, wherein the triggering event of motion detection determines whether motion is present proximal the air conditioner apparatus and performs the dispensing of the at least one of the air treatment and the scent via the processing circuitry in response to the presence of the motion and based on a location of the motion, and wherein the triggering event of light detection determines whether a change in a light level is present proximal the air conditioner apparatus and performs the dispensing of the at least one of the air treatment and the scent via the processing circuitry in response to the change, and wherein the triggering event of rodent detection identifies the presence of a rodent via a motion detector of a sensor array controlled by the processing circuitry, wherein the processing circuitry controls the at least one dispenser to dispense the odorless pest repellant into the air stream of the air conditioner apparatus in response to identifying the presence of the rodent.

17. A non-transitory computer-readable medium having stored thereon computer-readable instructions which when executed by a computer cause the computer to perform a method implemented by an air conditioner apparatus having processing circuitry and at least one dispenser controlled by the processing circuitry, the method comprising:

controlling the at least one dispenser to dispense the at least one of the air treatment and the scent into an air stream of the air conditioner apparatus in response to five of a plurality of triggering events, the plurality of triggering events including facial recognition, air contaminant detection, motion detection, light detection, and rodent detection, the at least one of the air treatment and the scent including odorless pest repellant, wherein the triggering event of facial recognition compares and maps recognized faces proximal the air conditioner apparatus to the at least one of the air treatment and the scent to map the recognized faces to a preferred air treatment and scent by a majority rule, wherein the triggering event of air contaminant detection determines whether an air contaminant is present proximal the air conditioner apparatus and performs the dispensing of the at least one of the air treatment and the scent via the processing circuitry in response to the presence of the air contaminant, wherein the triggering event of motion detection determines whether motion is present proximal the air conditioner apparatus and performs the dispensing of the at least one of the air treatment and the scent via the processing circuitry in response to the presence of the motion and based on a location of the motion, and wherein the triggering event of light detection determines whether a change in a light level is present proximal the air conditioner apparatus and performs the dispensing of the at least one of the air treatment and the scent via the processing circuitry in response to the change, and wherein the triggering event of rodent detection identifies the presence of a rodent via a motion detector of a sensor array controlled by the processing circuitry, wherein the processing circuitry controls the at least one dispenser to dispense the odorless pest repellant into the air stream of the air conditioner apparatus in response to identifying the presence of the rodent.

* * * * *